(12) United States Patent
Mittal

(10) Patent No.: US 9,619,672 B2
(45) Date of Patent: *Apr. 11, 2017

(54) METHOD AND APPARATUS FOR SECURE EXECUTION USING A SECURE MEMORY PARTITION

(71) Applicant: Intel Corporation, Santa Clara, CA (US)

(72) Inventor: Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/583,062

(22) Filed: Dec. 24, 2014

(65) Prior Publication Data

US 2015/0121090 A1    Apr. 30, 2015

Related U.S. Application Data

(63) Continuation of application No. 13/843,215, filed on Mar. 15, 2013, which is a continuation of application No. 12/977,468, filed on Dec. 23, 2010, now Pat. No. 8,627,053, which is a continuation of application No. 12/977,459, filed on Dec. 23, 2010, now Pat. No. 8,347,072, which is a continuation of application No. 12/911,640, filed on Oct. 25, 2010, now Pat. No. 8,549,275, which is a continuation of application No.

(Continued)

(51) Int. Cl.
| | |
|---|---|
| *G06F 12/14* | (2006.01) |
| *G06F 21/72* | (2013.01) |
| *G06F 21/60* | (2013.01) |
| *G06F 21/78* | (2013.01) |

(52) U.S. Cl.
CPC .......... *G06F 21/72* (2013.01); *G06F 12/1408* (2013.01); *G06F 12/1441* (2013.01); *G06F 12/1491* (2013.01); *G06F 21/60* (2013.01); *G06F 21/602* (2013.01)

(58) Field of Classification Search
None
See application file for complete search history.

(56) References Cited

U.S. PATENT DOCUMENTS

| | | |
|---|---|---|
| 4,238,854 A | 12/1980 | Ehrsam et al. |
| 4,573,119 A | 2/1986 | Westheimer et al. |

(Continued)

FOREIGN PATENT DOCUMENTS

| | | |
|---|---|---|
| DE | 42 17 444 A1 | 12/1992 |
| EP | 0 473 913 A2 | 3/1992 |

(Continued)

OTHER PUBLICATIONS

IBM Corporation, "IBM ThinkPad T30 notebooks", Perfect Balance of Performance and Portability, IBM, Apr. 2002, 6 pages.

(Continued)

*Primary Examiner* — Venkat Perungavoor
(74) *Attorney, Agent, or Firm* — Vecchia Patent Agent, LLC

(57) ABSTRACT

A processor capable of secure execution. The processor contains an execution unit and secure partition logic that secures a partition in memory. The processor also contains cryptographic logic coupled to the execution unit that encrypts and decrypts secure data and code.

12 Claims, 5 Drawing Sheets

Related U.S. Application Data

11/229,669, filed on Sep. 20, 2005, now Pat. No. 7,822,979, which is a continuation of application No. 09/608,439, filed on Jun. 30, 2000, now Pat. No. 6,986,052.

(56) References Cited

U.S. PATENT DOCUMENTS

| | | | |
|---|---|---|---|
| 4,987,595 | A | 1/1991 | Marino, Jr. et al. |
| 5,029,206 | A | 7/1991 | Marino, Jr. et al. |
| 5,065,429 | A | 11/1991 | Lang |
| 5,146,575 | A | 9/1992 | Nolan, Jr. |
| 5,237,609 | A | 8/1993 | Kimura |
| 5,237,616 | A | 8/1993 | Abraham et al. |
| 5,249,232 | A | 9/1993 | Erbes et al. |
| 5,379,342 | A | 1/1995 | Arnold et al. |
| 5,471,599 | A | 11/1995 | Brodnax et al. |
| 5,493,665 | A | 2/1996 | Eisenberg |
| 5,559,960 | A | 9/1996 | Lettvin |
| 5,592,616 | A | 1/1997 | Finch et al. |
| 5,627,987 | A | 5/1997 | Nozue et al. |
| 5,668,973 | A | 9/1997 | Stutz et al. |
| 5,717,942 | A | 2/1998 | Haupt et al. |
| 5,761,716 | A | 6/1998 | Byrn et al. |
| 5,778,070 | A * | 7/1998 | Mattison ............... 713/191 |
| 5,799,185 | A | 8/1998 | Watanabe |
| 5,802,592 | A | 9/1998 | Chess et al. |
| 5,835,594 | A * | 11/1998 | Albrecht et al. ............. 713/187 |
| 5,841,869 | A | 11/1998 | Merkling et al. |
| 5,845,129 | A | 12/1998 | Wendorf et al. |
| 5,870,520 | A | 2/1999 | Lee et al. |
| 5,883,956 | A | 3/1999 | Le et al. |
| 5,884,026 | A | 3/1999 | Kong |
| 5,892,944 | A | 4/1999 | Fukumoto et al. |
| 5,937,063 | A | 8/1999 | Davis |
| 5,982,887 | A | 11/1999 | Hirotani |
| 5,987,572 | A | 11/1999 | Weidner et al. |
| 5,991,399 | A | 11/1999 | Graunke et al. |
| 5,995,623 | A | 11/1999 | Kawano et al. |
| 6,003,117 | A | 12/1999 | Buer et al. |
| 6,012,141 | A | 1/2000 | Isaman |
| 6,029,000 | A * | 2/2000 | Woolsey et al. ............. 717/147 |
| 6,029,247 | A | 2/2000 | Ferguson |
| 6,052,780 | A | 4/2000 | Glover |
| 6,061,449 | A | 5/2000 | Candelore et al. |
| 6,085,296 | A | 7/2000 | Karkhanis et al. |
| 6,101,586 | A | 8/2000 | Ishimoto et al. |
| 6,105,113 | A | 8/2000 | Schimmel |
| 6,138,236 | A | 10/2000 | Mirov et al. |
| 6,141,756 | A * | 10/2000 | Bright et al. ................ 726/22 |
| 6,149,522 | A * | 11/2000 | Alcorn et al. ................ 463/29 |
| 6,152,367 | A * | 11/2000 | Kowalski ................ 235/382 |
| 6,157,398 | A | 12/2000 | Jeddeloh |
| 6,212,633 | B1 * | 4/2001 | Levy ............. H04L 12/40104 380/283 |
| 6,289,455 | B1 | 9/2001 | Kocher et al. |
| 6,651,171 | B1 | 11/2003 | England et al. |
| 6,711,675 | B1 | 3/2004 | Spiegel et al. |
| 6,971,022 | B1 | 11/2005 | Katta et al. |
| 9,305,183 | B2 | 4/2016 | Mittal |
| 9,323,954 | B2 | 4/2016 | Mittal |
| 2004/0177261 | A1 | 9/2004 | Watt et al. |
| 2005/0166069 | A1 | 7/2005 | Hashimoto et al. |

FOREIGN PATENT DOCUMENTS

| | | |
|---|---|---|
| EP | 0 600 112 A1 | 6/1994 |
| EP | 0930 567 A2 | 7/1999 |
| EP | 0 965 903 A1 | 12/1999 |
| EP | 1 030 237 A1 | 8/2000 |
| EP | 1 055 989 A1 | 11/2000 |
| EP | 1 056 014 A1 | 11/2000 |
| EP | 0 892 521 B2 | 1/2003 |
| GB | 1483282 A | 8/1977 |
| JP | S57-81650 A | 5/1982 |
| JP | S57-83850 A | 5/1982 |
| JP | 64-021637 A | 1/1989 |
| JP | 09-160831 A | 6/1997 |
| JP | 10-228421 A | 8/1998 |
| JP | 10-333902 A | 12/1998 |
| JP | 2000-076139 A | 3/2000 |
| WO | 97/29567 A1 | 8/1997 |
| WO | 98/34365 A1 | 8/1998 |
| WO | 98/44402 A1 | 10/1998 |
| WO | 00/23875 A1 | 4/2000 |
| WO | 00/62232 A1 | 10/2000 |
| WO | 01/27723 A1 | 4/2001 |
| WO | 01/27821 A2 | 4/2001 |
| WO | 01/75564 A2 | 10/2001 |
| WO | 01/75565 A2 | 10/2001 |
| WO | 01/75595 A2 | 10/2001 |
| WO | 02/03208 A2 | 1/2002 |
| WO | 02/17555 A2 | 2/2002 |
| WO | 02/086684 A2 | 10/2002 |
| WO | 03/058412 A2 | 7/2003 |

OTHER PUBLICATIONS

Intel Corporation, "IA-32 Intel Architecture Software Developer's Manual", vol. 3: System Programming Guide, 2003, 43 pages.
Intel Corporation, "IA-64 System Abstraction Layer Specification", XP-002253057, Jan. 2000, 48 pages.
Intel Corporation, "Intel 82802AB/82802AC Firmware Hub (FWH)", Datasheet, XP-002257561, Nov. 2000, 18 pages.
Intel Corporation, "Intel386TM DX Microprocessor 32-BIT CHMOS Microprocessor with Integrated Memory Management", Dec. 1995, 57 pages.
Karger, et al., "A VMM Security Kernel for the VAX Architecture", IEEE, May 1990, 19 pages.
Kashiwagi, et al., "Design and Implementation of Dynamically Reconstructing System Software", IEEE, Aug. 1996, 11 pages.
Kuhn, Markus, "The TrustNo 1 Cryptoprocessor Concept", CS555 Report, Apr. 30, 1997, 6 pages.
Lawton, Kevin P., "Running Multiple Operating Systems Concurrently on an IA32 PC Using Virtualization Techniques", last modified Nov. 29, 1999, 31 pages.
Luke, et al., "Replacement Strategy for Aging Avionics Computers", IEEE, AES Systems Magazine, Mar. 1999, 6 pages.
Menezes, et al., "Handbook of Applied Cryptography", CRC Press LLC, 1997, ISBN: 0-8493-8523-7, 1997, pp. 403-405, 475, 506-515, 570.
Motorola Inc., "M68040 User's Manual", Motorola, 1990, 97 pages.
Nanba, et al., "VM/4z ACOS-4 Virtual Machine Architecture", IEEE, 1985, pp. 171-178.
Richt, et al., In-Circuit-Emulator Wird 'Echtzeittauglich', 2087 Elektronik, vol. 40, No. 16, Aug. 6, 1991, pp. 100-103.
Robin, et al., "Analysis of the Intel Pentium's Ability to Support a Secure Virtual Machine Monitor", proceedings of the 9th USENIX Security Symposium, Aug. 14-17, 2000, 16 pages.
Rosenblum, Mendel, "VMware's Virtual Platform: A Virtual Machine Monitor for Commodity PCs", Hot Chips 11 conference, VMware Inc., Aug. 15-17, 1999, 19 pages.
RSA Security Inc., "Hardware Authenticators", 2004, 2 pages.
RSA Security Inc., "RSA SecurID Authenticators: The gold standard in two-factor user authentication", 2003, SID DS 0103, 2 pages.
RSA Security Inc., "Software Authenticators", 2004, 2 pages.
Saez, et al., "A Hardware Scheduler for Complex Real-Time Systems", IEEE, ISIE'99-Bled, Apr. 1999, pp. 43-48.
Schneier, Bruce "Applied Croptography", 1996, 2nd ed., ISBN 0-471-12845-7, John Wiley & Sons. 28-33, 47-52, 56-65, 176.
Sherwood, et al., "Patchable Instruction ROM Architecture", CASES'01, Nov. 16-17, 2001, pp. 24-33.
Trusted Computing Platform Alliance, "TCPA Main Specification Version 1.0", Jan. 25, 2001, pp. 123-227.
Trusted Computing Platform Alliance, "TCPA Main Specification Version 1.1a", Dec. 1, 2001, 212 pages.

(56) References Cited

OTHER PUBLICATIONS

Non-Final Office Action received for U.S. Appl. No. 13/843,215, mailed on Jun. 9, 2014, 14 pages.
Non-Final Office Action received for U.S. Appl. No. 13/843,215, mailed on May 12, 2015, 17 pages.
Final Office Action received for U.S. Appl. No. 13/843,215, mailed on Sep. 21, 2015, 14 pages.
Office Action received for Chinese Patent Application No. 01814609.0, mailed on Dec. 3, 2004, 9 pages of English Translation only.
Office Action received for Chinese Patent Application No. 01814609.0, mailed on Feb. 2, 2007, 5 pages of English Translation only.
Non-Final Office Action received for U.S. Appl. No. 09/608,439, mailed on Apr. 6, 2004, 10 pages.
Non-Final Office Action received for U.S. Appl. No. 09/608,439, mailed on Dec. 9, 2004, 15 pages.
Notice of Allowance received for U.S. Appl. No. 09/608,439, mailed on Jun. 8, 2005, 4 pages.
Final Office Action received for U.S. Appl. No. 11/229,669, mailed on Jan. 30, 2007, 11 pages.
Final Office Action received for U.S. Appl. No. 11/229,669, mailed on Sep. 30, 2008, 7 pages.
Non-Final Office Action received for U.S. Appl. No. 11/229,669, mailed on Apr. 10, 2008, 8 pages.
Non-Final Office Action received for U.S. Appl. No. 11/229,669, mailed on May 7, 2009, 8 pages.
Non-Final Office Action received for U.S. Appl. No. 11/229,669, mailed on May 24, 2006, 6 pages.
Non-Final Office Action received for U.S. Appl. No. 11/229,669, mailed on Nov. 27, 2009, 4 pages.
Notice of Allowance received for U.S. Appl. No. 11/229,669, mailed on Jun. 24, 2010, 6 pages.
Notice of Allowance received for U.S. Appl. No. 11/229,669, mailed on May 18, 2010, 8 pages.
Final Office Action received for U.S. Appl. No. 12/911,640, mailed on Sep. 21, 2012, 7 pages.
Non-Final Office Action received for U.S. Appl. No. 12/911,640, mailed on Dec. 12, 2011, 9 pages.
Non-Final Office Action received for U.S. Appl. No. 12/911,640, mailed on Jun. 3, 2011, 34 pages.
Non-Final Office Action received for U.S. Appl. No. 12/911,640, mailed on May 11, 2012, 9 pages.
Notice of Allowance received for U.S. Appl. No. 12/911,640, mailed on Jan. 31, 2013, 5 pages.
Notice of Allowance received for U.S. Appl. No. 12/911,640, mailed on May 24, 2013, 8 pages.
Non-Final Office Action received for U.S. Appl. No. 12/977,459, mailed on Apr. 4, 2012, 9 pages.
Notice of Allowance received for U.S. Appl. No. 12/977,459, mailed on Aug. 30, 2012, 5 pages.
Non-Final Office Action received for U.S. Appl. No. 12/977,468, mailed on Jul. 15, 2011, 40 pages.
Notice of Allowance received for U.S. Appl. No. 12/977,468, mailed on Aug. 30, 2013, 9 pages.
Final Office Action received for U.S. Appl. No. 13/843,215, mailed on Oct. 22, 2014, 12 pages.
Non-Final Office Action received for U.S. Appl. No. 14/583,051, mailed on Jun. 22, 2015, 9 pages.
Non-Final Office Action received for U.S. Appl. No. 14/583,054, mailed on Jun. 30, 2015, 10 pages.
Non-Final Office Action received for U.S. Appl. No. 14/583,056, mailed on Jul. 23, 2015, 10 pages.
Non-Final Office Action received for U.S. Appl. No. 14/583,060, mailed on Jun. 15, 2015, 12 pages.
Non-Final Office Action received for U.S. Appl. No. 14/583,061, mailed on Jun. 24, 2015, 9 pages.
Office Action received for European Patent Application No. 1948290, mailed on Mar. 11, 2010, 4 pages.
Office Action received for European Patent Application No. 1948290, mailed on Oct. 22, 2009, 3 pages.
Office Action received for Japanese Patent Application No. 2002-508208, mailed on Apr. 26, 2011, 5 pages of English Translation and 5 pages of Japanese Office Action.
Office Action received for Japanese Patent Application No. 2011-234826, mailed on Mar. 13, 2012, 6 pages of English Translation and 4 pages of Japanese Office Action.
Office Action received for Japanese Patent Application No. 2011-234826, mailed on Sep. 4, 2012, 3 pages of English Translation and 4 pages of Japanese Office Action.
International Preliminary Report on Patentability received for PCT Patent Application No. PCT/US2001/018447, mailed on Feb. 10, 2004, 3 pages.
International Search Report received for PCT Patent Application No. PCT/US2001/018447, mailed on Nov. 14, 2002, 8 pages.
Berg, Cliff, "How Do I Create a Signed Applet?", Dr. Dobb's Journal, Aug. 1997, 9 pages.
Brands, Stefan, "Restrictive Blinding of Secret-Key Certificates", CWI, XP-002201306, Springer Verlag, Amsterdam, 1995, 35 pages.
Chien, et al., "Safe and Protected Execution for the Morph/AMRM Reconfigurable Processor", 7th Annual IEEE Symposium, FCCM '99 Proceedings, ISBN 0-7695-0375-6, Apr. 1, 1999, 13 pages.
Coulouris, et al., "Distributed Systems: Concepts and Design", Queen Mary and Westfield College University of London, 2nd edition, Addison-Wesley Publishing Ltd., 1998, pp. 422-424.
Crawford, John, "Architecture of the Intel 80386", IEEE, Jan. 1986, pp. 155-160.
Davida, et al., "Defending Systems Against Viruses through Cryptographic Authentication", IEEE, Jul. 1989, pp. 312-318.
Fabry, R.S., "Capability-Based Addressing", Communications of the ACM, vol. 17, No. 7, Jul. 1974, pp. 403-412.
Frieder, Dr. Gideon, "The Architecture and Operational Characteristics of the VMX Host Machine", IEEE, 1982, pp. 9-16.
Goldberg, Robert P., "Survey of Virtual Machine Research", Computer, vol. 7, No. 6, Jun. 1974, pp. 34-45.
Gong, et al., "Going Beyond the Sandbox: An Overview of the New Security Architecture in the Java Development Kit 1.2", USENIX, Symposium on Internet Technologies and Systems, Dec. 1997, 11 pages.
Gum, P.H., "System/370 Extended Architecture: Facilities for Virtual Machines", IBM, J. Res. Develop., vol. 27, No. 6, Nov. 1983, pp. 530-544.
Heinrich, Joe, "MIPS R4000 Microprocessor User's Manual", 2nd edition, MIPS Technologies, Inc., 1994, pp. 61-97.
Hewlett-Packard Company, "Mobile Security Overview", Sep. 2002, 10 pages.
IBM Corporation, "Information Display Technique for a Terminate Stay", IBM Technical Disclosure Bulletin, vol. 34, No. 7A, Dec. 1, 1991, 4 pages.
Non Final Office Action received for U.S. Appl. No. 13/843,215, mailed on Mar. 9, 2016, 9 pages.
Notice of Allowance received for U.S. Appl. No. 14/583,054, mailed on Mar. 16, 2016, 8 pages.
Notice of Allowance received for U.S. Appl. No. 14/583,056, mailed on Apr. 12, 2016, 7 pages.
Notice of Allowance received for U.S. Appl. No. 14/583,061, mailed on Mar. 14, 2016, 7 pages.
Notice of Allowance received for U.S. Appl. No. 14/583,061, mailed on Aug. 1, 2016, 7 pages.
Notice of Allowance received for U.S. Appl. No. 14/583,054, mailed on Aug. 2, 2016, 7 pages.
Notice of Allowance received for U.S. Appl. No. 14/583,056, mailed on Sep. 23, 2016, 8 pages.
Final Office Action received for U.S. Appl. No. 13/843,215, mailed on Oct. 13, 2016, 11 pages.

* cited by examiner

METHOD AND APPARATUS FOR SECURE EXECUTION USING A SECURE MEMORY PARTITION

FIELD OF THE INVENTION

Embodiments of the present invention relate to secure execution in a processor. In particular, the present invention relates to a method and apparatus for secure execution using a secure memory partition.

BACKGROUND

The tremendous increase in connectivity of computers has increased the importance of a robust security infrastructure. A computer system's security features can be used to prevent unauthorized access (e.g., from the Internet). A secure execution environment that preserves the privacy and integrity of transactions is important to enable the use of Internet based commerce. A secured execution environment could also be used to provide copy protection for published software or content (e.g., movies) stored on media like Digital Versatile Disks (DVDs) or Compact Disk-Read Only Memories (CD-ROMs).

Securing execution includes ensuring the integrity of the execution and ensuring the privacy of code and data. Various types of threats may lead to a compromise of the integrity or privacy of a system. For example, malicious software may be able to exploit weaknesses in the operating system. Direct memory access devices may be able to read physical memory without processor support. A logic analyzer may be used to observe the traffic between the processor and the memory. Attacks may also be made which take advantage of a processor's built-in debug mode or probe mode or which physically modify the connectivity of components in the system to observe and modify the communication between the components. An attacker could also subject the hardware to an abnormal voltage, temperature or frequency so as to compromise the execution of the system and possibly cause hardware to "leak" out secrets. In addition, an attacker could remove the process layers selectively to expose the device structures hiding the secrets or use an Ion beam to examine the flow of signals inside the device.

Some security schemes, such as those based on public/private key cryptography, uses private data or code that needs to be kept secret. In several cases, the encoding algorithm used is publicly known, and the strength of the cryptography is in keeping the key secret. Intermediate data, such as the control flow information of the program, should not be exposed because it may make it easier to determine the private key. In this regard, conditional assignment capability of a processor architecture may be used to eliminate branches on the secret data, but it is difficult to design code to meet this requirement. For some applications, part of the cryptographic strength is in the privacy of the algorithm itself. In this case, the execution environment needs to guarantee that even the execution code, along with the input data and all intermediate results, is kept private.

In some systems, a special security coprocessor is used to protect the code and data of a host processor. Known systems do not provide an effective means for a host processor to protect the private code or data (e.g., a key) within the host processor against attacks that use, for example, malicious software, direct memory access devices, logic analyzers, exploit the system debug/probe mode, or modify the hardware to reveal secrets.

DETAILED DESCRIPTION

Embodiments of the present invention provide for secure execution by storing sensitive code and data in a secure memory partition. The sensitive code and data may include the code and data used to verify the authenticity and integrity of transmissions received over a network and may include content stored on a media such as a DVD or CD-ROM. A secure memory partition may be defined by the architecture as an address range within the general address space of the processor. The partition may be an address range of virtual memory locations or physical memory locations. The address range may be specified by a base address and a range. The secure memory partition may have a fixed entry point. In a further embodiment, the sensitive code and data is encrypted by hardware on the processor before it is written to the memory, and decrypted after it is read back into the processor, to protect the sensitive code and data from disclosure. Different embodiments of this invention provide protection against different levels of threats. Embodiments provide a high degree of protection against attacks based on malicious software, intelligent I/O devices, attacks using a logic analyzer, and hardware attacks that comprise de-socketing of the processor and then placing it in an integrity compromised platform.

Embodiments of a Secure Execution System

Figure 1:
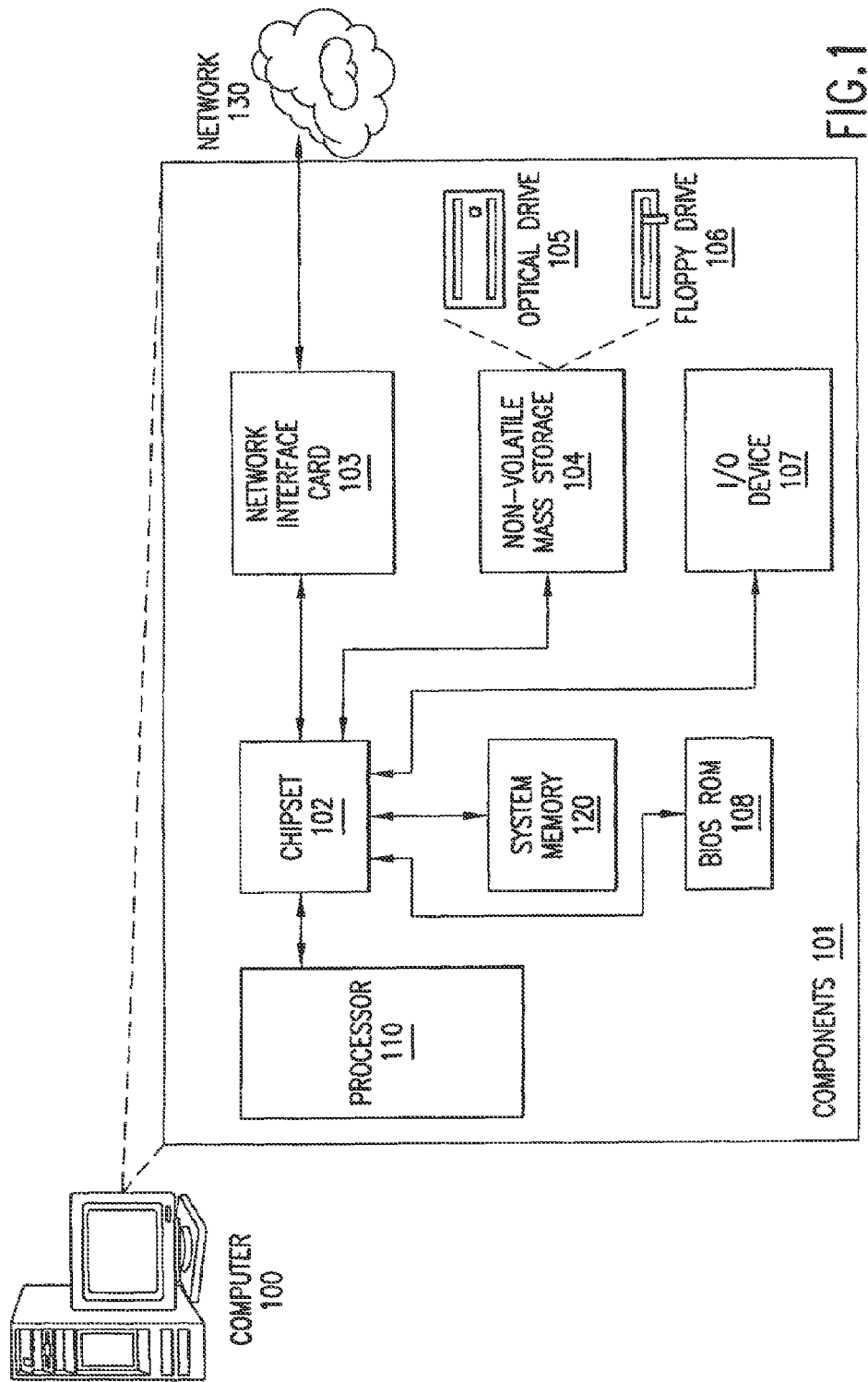
FIG. 1 is a partial block diagram of a computer system capable of secure execution according to an embodiment of the present invention.

FIG. 1 is partial block diagram of a computer system capable of secure execution according to an embodiment of the present invention. Computer 100 contains components 101, which may include a processor 110, chipset 102, system memory 120, network interface card 103, non-volatile mass storage 104, input/output (I/O) device 107, and basic input/output system (BIOS) ROM 108. The processor 110 may be coupled to the chipset 102. The term "coupled" encompasses a direct connection, an indirect connection, an indirect communication, etc. Chipset 102 may also be coupled to system memory 120, network interface card 103, non-volatile mass storage 104, input/output device 107 and BIOS ROM 108. These devices may be coupled to chipset 102 over a bus or busses such as a system bus, peripheral component interface (PCI) bus, etc. Network interface card 103 may be coupled to a network 130. Computer 100 may also contain additional components such as a co-processor, modem, etc.

Processor 110 may be a general purpose microprocessor such as a PENTIUM class processor manufactured by Intel Corp. of Santa Clara, Calif. In another embodiment, the processor can be an Application Specific Integrated Circuit (ASIC), controller, micro-controller, etc. Chipset 102 may be one or more integrated circuit chips that acts as a hub or core for data transfer between the processor and other components of the computer system. In an embodiment, chipset 102 includes a memory control hub (MCH), which performs what is known as "northbridge functionality," and an input/output controller hub (ICH), which performs what is known as "southbridge functionality." System memory 120 is any device adapted to store digital information, such as a dynamic random access memory (DRAM), a static random access memory (SRAM), etc. or any combination thereof. In an embodiment, system memory 120 is a volatile memory. Processor 110, chipset 102, system memory 120, and BIOS ROM 108 may be mounted on a system motherboard in computer 100.

Network interface card 103 may contain logic to communicate using a standard network protocol. Network 130 may be a local or wide area computer network and may be, for example, an intranet or the Internet. Non-volatile mass storage 104 may be any device or devices adapted to store digital information, such as flash memory, a hard disk, an optical digital storage device, a magneto-electrical storage device, DVD, CD-ROM, etc., or any combination thereof. FIG. 1 shows non-volatile mass storage 104 as including an optical storage 105 and a floppy drive 106. Input/output device 107 may be a keyboard, mouse, display screen, printer, etc. or any combination of thereof. BIOS ROM 108 may contain the code to control peripheral devices such as a keyboard, display screen, disk drives, serial communications. BIOS ROM 108 may also contain code that is used to perform other miscellaneous functions.

Figure 2:
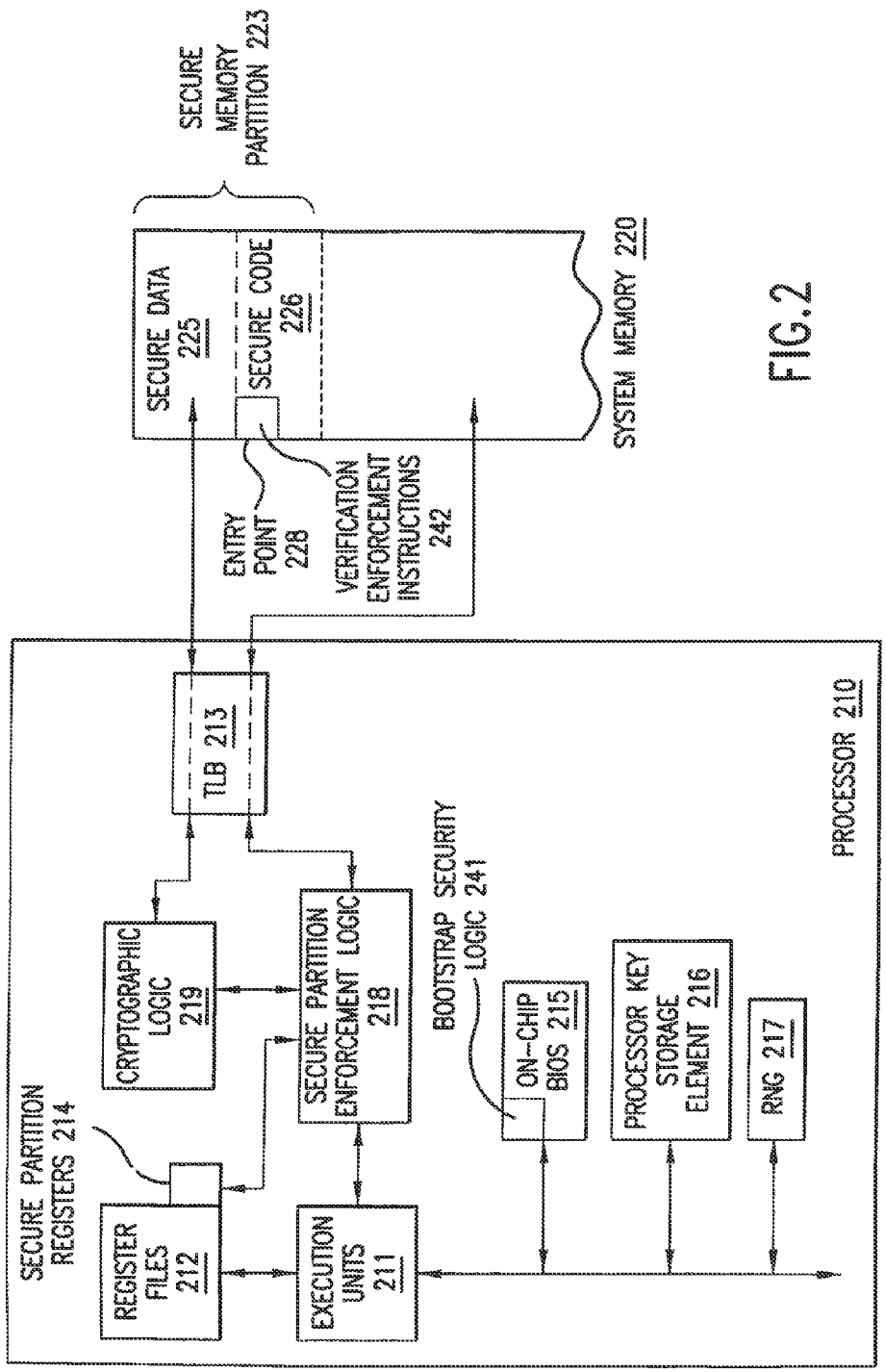
FIG. 2 is a partial block diagram of a processor having secure execution components and a memory with a secure partition according to an embodiment of the present invention.

FIG. 2 is a partial block diagram of a processor having secure execution components and a memory with a secure partition according to an embodiment of the present invention. FIG. 2 shows a processor 210 and a system memory 220 which are part of a computer system such as, for example, the computer system 100 shown in FIG. 1. Processor 210 and a system memory 220 may be the same as processor 110 and system memory 120 of FIG. 1. Processor 210 may be coupled to system memory 220, for example, through a chipset such as chipset 102 of FIG. 1.

Processor 210 may contain execution units 211, such as for example an arithmetic logic unit, which may be coupled to register files 212. Register files 212 may include a plurality of registers such as general purpose registers, flag registers, an instruction pointer, index registers, etc. or a combination thereof. Register files 212 may include secure partition registers 214. Execution units 211 may be coupled to a on-chip basic input/output system (BIOS) 215, processor key storage element 216, and random number generator (RNG) unit 217. On-chip BIOS 215 may contain burned-in logic that is used by the processor to communicate with other system components, such as system memory 120, and may contain the logic run when the processor is initiated (booted up). This logic may include bootstrap security logic 241 as described below. In addition, on-chip BIOS 215 may contain logic (e.g., firmware, microcode, etc.) to load the instructions from BIOS ROM 108 into the system memory upon system initiation. Processor key storage element 216 contains the private key or keys that processor 210 may use to verify and authenticate information received from other system components and from other computer systems. The processor keys may be burned into the processor key storage element 216. Random number generator unit 217 may be a hardware random number generator that uses any randomization function. In one embodiment, random number generator unit 217 utilizes statistical phenomenon in physical devices (thermal noise, for example) to provide random numbers.

In this embodiment, execution units 211 may also be coupled to secure partition enforcement logic 218 which contains the logic to manage a secure partition in a memory or memories as described below. In a further embodiment, secure partition enforcement logic 218 is coupled to an cryptographic logic 219 which encrypts information that is to be stored in a secure partition and decrypts information that is read from a secure partition. Cryptographic logic 219 may be hardware logic that implements an algorithm such as Data Encryption Standard (DES), Rivest-Shamir-Adleman (RSA), or Digital Signal Standard (DSS) encryption. In one embodiment, the cryptographic logic 219 uses a platform specific key rather than the processor keys stored in processor key storage element 216. Secure partition enforcement logic 218 and cryptographic logic 219 may be coupled to a translation look-aside buffer (TLB) 213 which may be used to match virtual addresses in the address space of processor 210 to physical addresses in system memory 220 and in other memories accessed by processor 210.

FIG. 2 also shows system memory 220 containing a secure memory partition 223. Secure memory partition 223 may be a section of physical memory or virtual memory that is only accessed by code residing in the secure partition. In one embodiment, secure partition 223 may be defined by two secure partition registers 214. For example, secure partition 223 by a secure partition virtual address base register, which species the start of the secure partition in virtual memory, and a secure partition virtual address range register, which specifies the size of the secure partition. In FIG. 2, secure partition 223 is shown mapped to physical addresses in system memory 220. Secure memory partition 223 may contain a secure data section 225 and a secure code section 226. The secure code section 226 may store, for example, trusted verification enforcement instructions 242 which are used to apply cryptography algorithm and verify the authenticity and integrity of transmissions received over a network (or of content stored on a media such as a DVD or CD-ROM. Secure data section 225 may contain data used by the secure code, such as private keys and intermediate data (e.g., control flow information of the secure instructions). Secure code section 226 may have an entry point 228, which may be used as described below.

The embodiment shown in FIG. 2 may operate as follows. The processor 210 ensures the integrity of the platform by authenticating the BIOS code (e.g., in BIOS ROM 108) by using bootstrap security logic such as processor microcode or on-chip BIOS verification firmware code which is shown in FIG. 2 as bootstrap security logic 241. The secure BIOS 108 then in turn validates the presence of any other protection mechanisms in the chipset. According to an embodiment, when processor 210 is booted-up, it may create a secure partition by scanning the memory and determining a location for the secure partition. The processor may then program a secure partition base register and secure partition range register to define the secure partition. These registers may be write-once registers. In other embodiments, other mechanisms may be used to create the secure partition. The processor may then copy verification enforcement instructions 242 and associated data, such as keys, into secure memory partition 223 in system memory 220. In another embodiment, verification enforcement instructions 242 are copied during processor boot-up into secure memory partition 223 from a non-volatile mass storage such as a disk drive. In this embodiment, processor 210 may use bootstrap security logic 241 stored in on-chip BIOS 215 and key data stored in processor key storage element 216 to verify the authenticity and integrity of the verification enforcement instructions 242 and data copied into secure memory partition 223. This verification may determine if the verification enforcement instructions 242 stored in a non-volatile memory have been corrupted or compromised by an attack. Storing bootstrap security logic 241 in the processor and verification enforcement instructions 242 in a non-volatile memory may be less costly than burning the verification enforcement instructions 242 into the processor itself.

In an embodiment, secure partition enforcement logic 218 monitors any accesses to memory that are made by processor 210. Such accesses may include the execution of an instruction that is stored in the memory or the execution of an instruction that operates on data in the memory. An instruction operates on data in a location in a memory when the instruction reads data that is stored in the location or writes data to the location. In this embodiment, secure partition enforcement logic 218 will examine each instruction prior to execution of the instructions by processor 210. If the instruction is a branch to a location within the secure memory partition 223, other than the partition entry point 228, then the secure partition enforcement logic determines that the instruction should not be executed. In such a case, the partition instruction logic may trap to a trap handler. The secure partition enforcement logic 218 will permit the execution of branches to a location within the partition from another location within the partition, and will permit the execution of branches to the partition entry point 228. The entry point 228 may contain the start of a verification routine that verifies the authenticity of the software that jumped to the secure partition. Thus, for example, this routine might prevent an unauthorized or malicious program from executing the secure code. In addition, by enforcing the entry point to the secure code 226, secure partition enforcement logic 218 prevents unauthorized or malicious code from bypassing the verification routine. In a further embodiment, the secure partition enforcement logic determines not to execute an instruction when the instruction is not stored at a partition entry point and the previous instruction executed was the instruction before the beginning of the partition. Thus, if the partition entry point 228 is not the first instruction in the partition, the secure partition enforcement logic 218 will prevent the processor from sequentially stepping into the secure partition at a point other than the entry point.

In this embodiment, the secure partition enforcement logic will determine to not execute an instruction when the instruction is located outside of the secure partition and attempts to operate on (e.g., reads from or writes to) a location within the secure partition. Thus only the trusted instructions in the secure code section 226 may operate on data within the secure data section 225 of the secured memory partition 223. In this embodiment, the secure data cannot be accessed accept by code that is located in the secure partition. In a further embodiment, the code in the secure partition may access data that is outside of the secure partition. In another embodiment, secure partition enforcement logic 218 may determine not execute instructions which attempt to operate on data in the secure data section 225 of the partition if the instruction does not have the appropriate read/write permission. In another embodiment, the secure partition enforcement logic 218 may trap to a trap handler when an instruction outside of the secure partition attempts to operate on a location within the secure partition. It may also trap to a trap handler when an instruction attempts to operate on data in the secure data section without the appropriate read/write permission.

In an embodiment, secure memory partition 223 may be a partition in virtual memory. In an embodiment, the processor's address spaces is a virtual memory address space, and all instructions address memory in terms of virtual addresses. In this embodiment, the secure partition is specified in processor 210 by virtual addresses, such as a virtual address base register and a virtual address range register. By specifying the secure partition in terms of virtual addresses, the secure partition enforcement logic may be located earlier in the pipeline. The transaction lookaside buffer 213 may translate these virtual addresses into physical addresses. The virtual address to physical address mapping for the secure partition may be done through a trusted mechanism.

Figure 3:
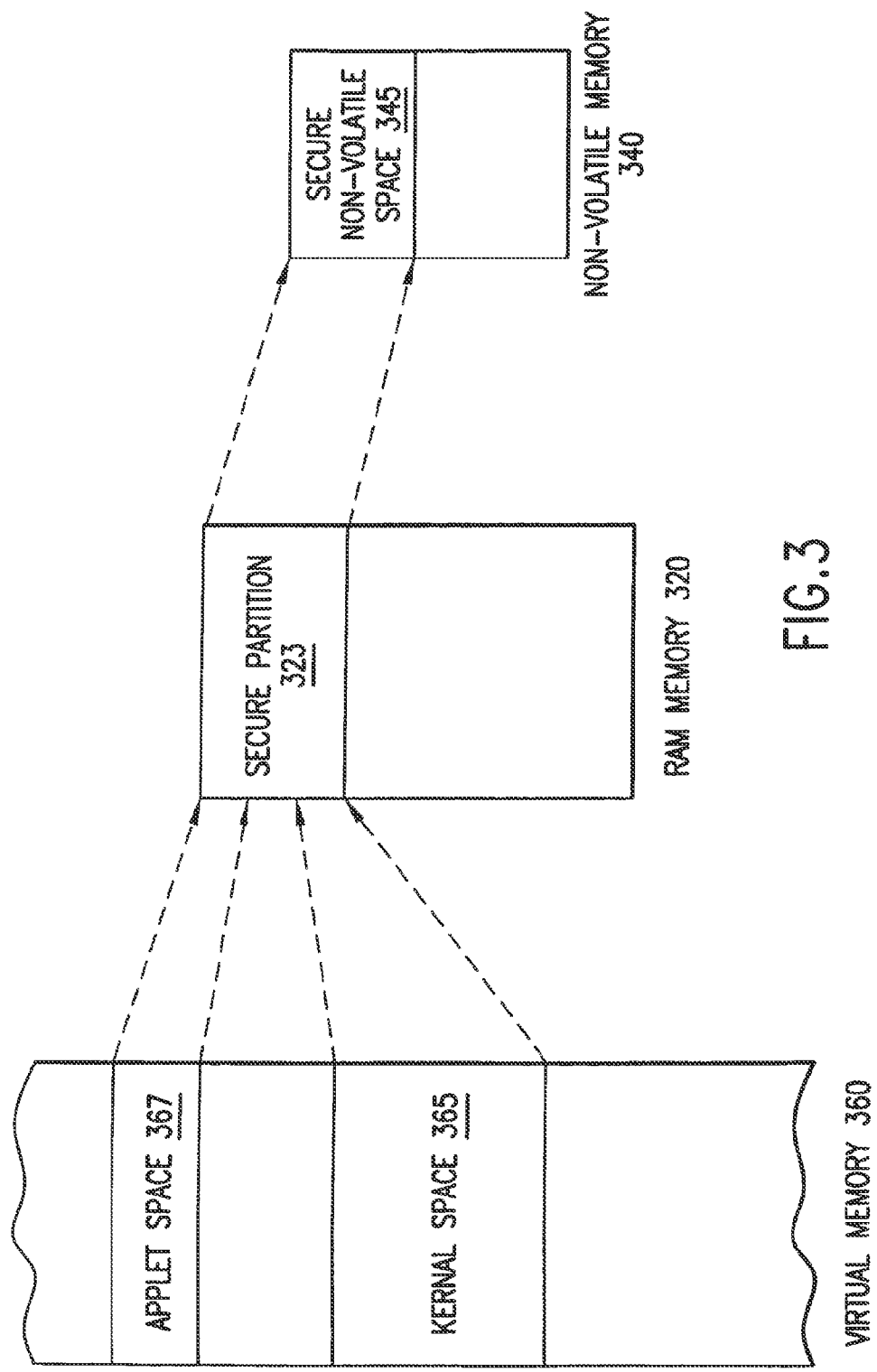
FIG. 3 is a partial block diagram of virtual and physical memory partitions.

FIG. 3 is a partial block diagram of virtual and physical memory partitions. FIG. 3 shows a virtual memory 360 that has an applet space 367 and a kernel space 365. The applet space 367 and the kernel space 365 map to a secure partition 323 in a physical memory 320. Information in the secure partition 323 may be swapped-out to a secure non-volatile space 345 in non-volatile memory 340. Non-volatile memory 340 may be a flash memory. In an embodiment, the secure non-volatile space 345 contains only a small portion of the code or data in the secure partition 323.

In an embodiment, verification enforcement instructions 242 and associated data are stored in secure partition 223 in encrypted form to protect against disclosure of the code and data either while in transit from processor 210 to the memory or while stored in the memory. According to this embodiment, secure code and data will be decrypted by cryptographic logic 219 after they are transferred into processor 210 from a secure partition in memory so that execution units 211 may act on the code and data. Conversely, secure code and data will be encrypted by cryptographic logic 219 before they are transferred out of processor 210 to a secure partition in memory. In this way, the secure code and data will be protected from an attack by, for example, a direct memory access, logic analyzer, or Ion beam. If strong enough encryption is used, the attacker will not be able to determine the secure code or data even if they can determine the contents of the secure partition. In one embodiment, the secure code and data is encrypted and decrypted using a shared cryptographic algorithm such as, for example, the Diffi Heiman method. In such an embodiment, a cover key may be used to cover the data, and this cover key is not shared. The cover key may be generated by the boot-up logic. In a further embodiment, a system has a number of processors, and the cover key is shared by system processors.

In a further embodiment, the computer system has a secure partition in a non-volatile mass storage, such as a disk drive. The secure partition in non-volatile mass storage may be in addition to a secured partition in volatile mass storage. According to this embodiment, a partition in the non-volatile memory are addressable only by secured code.

Random number generator 217 may be used to carry out a cryptographic algorithm or to generate a new key. The processor may use a secure Non-volatile (NV) memory to keep current a monotonic value.

Figure 4:
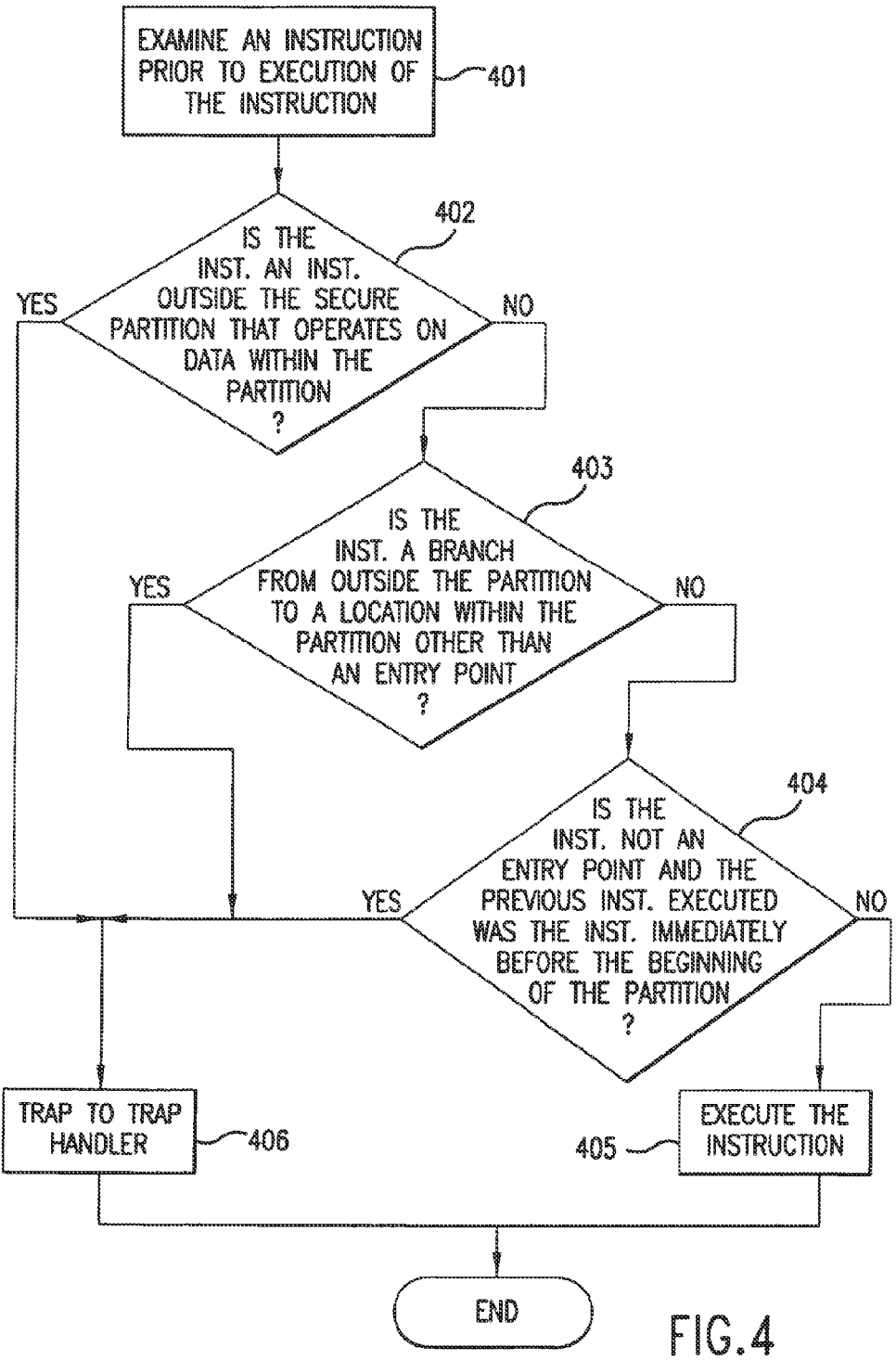
FIG. 4 shows a flow chart of a method of processing an instruction according to an embodiment of the present invention.

FIG. 4 shows a flow chart of a method of processing an instruction according to an embodiment of the present invention. The instruction may be, for example, an assembly language instruction that is to be executed by a processor such as processor 110 of 210 of FIGS. 1 and 2. The instruction is examined prior to execution (401). When the instruction is an unauthorized access to a location within a partition of locations in virtual memory, a determination is made not to execute the instruction. In an embodiment, a determination is made not to execute the instruction when the instruction operates on data in a location within the partition and the instruction is not stored within the partition (402). In a further embodiment, a determination is made not to execute the instruction when the instruction is a branch from a location outside the partition, the branch is to a location within the partition, and the branch is not to a partition entry point (403). According to another embodiment, a determination not to execute the instruction is made when the instruction is not stored at a partition entry point and the previous instruction executed was the instruction immediately before the beginning of the partition (404). If a determination is made that the instruction is authorized, then the instruction is executed (405). For example, the instruction may be executed when the instruction branches to a location within the partition from another location within the partition and when the instruction branches to a partition entry point from a location outside the partition. According to one embodiment, the method includes trapping to a trap handler when a determination is made not to execute the instruction (406).

Figure 5:
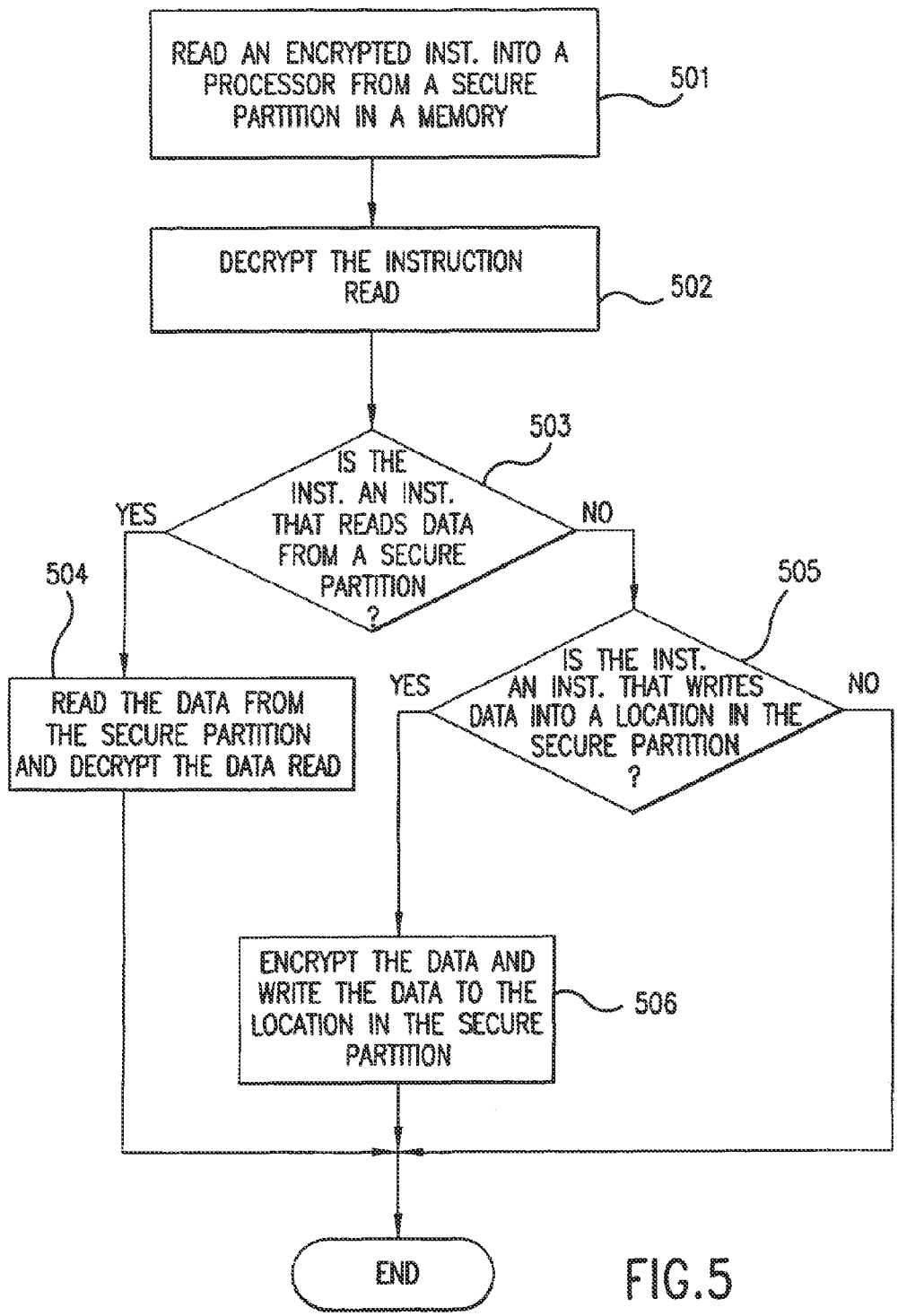
FIG. 5 shows a flow chart of another method of processing an instruction according to an embodiment of the present invention.

FIG. 5 shows a flow chart of another method of processing an instruction according to an embodiment of the present invention. According to an embodiment, an encrypted instruction is read into a processor from a secure partition in a memory (501). The instruction may have been encrypted using any cryptographic technique. The instruction read is decrypted (502), for example using the cryptographic logic 219 shown in FIG. 2. The decrypted instruction may then be executed. In an embodiment, if the instruction is an instruction that reads data from the secure partition (503), the data is read from the secure partition and the data read is decrypted (504). In another embodiment, if the instruction is an instruction that writes data into a location in the secure partition (505), the data is encrypted and the encrypted data is written into the secure partition (506). In a further embodiment, determining whether the instruction is an instruction that reads data from the secure partition or writes data to a location in the secure partition includes comparing the virtual address of the data with secure partition boundaries.

Security Privilege Levels (SPLs)

In an embodiment, two "security privilege levels" may be defined. One privilege level, referred to as security kernel privilege level, may be for executing only primitive security functions/services. A second privilege level may be defined for executing processor or third-party supplied security code. This second privilege level may be referred to as the applet privilege level. The new security privilege levels (SPLs) may be orthogonal to existing notions of privilege levels of execution. Thus, in this embodiment, the access (execute/read/write) privileges for a given virtual address range become a function of not only Current Privilege Level (CPL) but also current SPL (CSPL). CSPL indicates the security privilege level associated with the current execution. The default value of CSPL may be 3. In this case, when CSPL is 3, the execution model may be is referred to as the default execution model. When CSPL has a value other than default, the execution model is referred to as that of "Hidden Execution" model.

The two privilege levels may be referred to as SPL of 0 (for kernel) and SPL of 1 (for Applets). The composite privilege level may be referred to as ring x.y, where x is the CPL for current execution and y is the CSPL for current execution. Thus if the current execution's privilege level is 3.3, it implies that current application is executing at default ring 3. However, if the current privilege level is 3.0, it implies that current privilege level for execution is ring 3 with access rights associated with security Kernel privilege level. In one embodiment, the CSPL is always 3 in real mode, in which case there is no support for hidden execution in real mode.

Kernel Privilege Level

The architecture may define a new virtual address range that is used in the kernel privilege level. The new virtual address range may be defined by a Virtual Address Base Register kernel (VABRk) and Virtual Address Range Register kernel (VARRk). The virtual address range specified by VABRk and VARRk may be defined to have Kernel Level security access rights associated with it and may be referred to as the secure kernel space or the kernel's secure memory partition.

In an embodiment, only the code within secure kernel space can read or write in this space. In this case, the integrity and privacy of data and code within the secure kernel space will not be compromised by the code that is outside of this space. In a further embodiment, the code within secure kernel space can read and write data from/to any virtual address space provided such access is allowed, for example, by existing segmentation and paging protection mechanisms. In a still further embodiment, there are instructions defined that can only be executed when at the secure kernel privilege level. In another embodiment, the kernel virtual address space is freely relocatable. In a further embodiment, the size of the secure partition is fixed at the boot-up time and is not under control of general system software. For example, only pre-OS firmware or on-chip microcode may be able to write into a virtual address range register. In this case, the virtual address range register may either be not writeable by software at all (it is written by processor microcode) or may be write-once after reset (if written by the firmware).

In another embodiment, there is a fixed entry point into secure kernel space, and it is illegal to branch into secure kernel space from outside of this space to an offset other than the predefined offset for the entry point. From address space with default security privilege, secure kernel space may be entered through any control transfer mechanisms as long as it is to the fixed entry point. In a further embodiment, the kernel service requested by code at the kernel security privilege level may be a function of the current privilege level of the requester. In this embodiment, the code at the entry point into the secure kernel space examines caller's current privilege level and current security privilege level to determine whether or not the requested service is allowed. In an embodiment, the secure kernel address space may exit to the space with a current security privilege level of x.3 through any control transfer mechanism. In cases where the security kernel uses a call/return mechanism to change program flow, the security kernel may need to manage its secure stack space as well as transitions between secure and non-secure application stack spaces.

Applet Privilege Level

The architecture may define a new virtual address range within the general virtual address space of the processor. This virtual address range may be defined by two registers: a Virtual Address Base Register applet (VABRa), and a Virtual Address Range Register applet (VARRa). The address range defined by VABRa and VARRa has Applet Level may have security access rights associated with it, and may be referred to as secure applet space.

In an embodiment, for the virtual address space corresponding to Applet Security Privilege level, the read and write access rights are limited to code that is executing within the address range with Applet or Kernel security privilege level. In one embodiment, an application defining a secure applet space must also define a secure kernel space at the same current privilege level in the context of the same process. In an embodiment, no code, other than kernel or applet hidden execution code, can read or write within secure applet space. Thus the integrity and privacy of data and code that is within secure applet address space may not be compromised by the code that does not have security access rights (i.e. current security privilege level is 3). In this embodiment, the code within secure applet space can not read or write data within secure kernel address space and the code within secure applet space can read and/or write any other address range, other than secure kernel space, provided it is allowed by existing segmentation and paging and protection mechanisms. The secure applet space may be freely relocatable. The size of the partition may be fixed at the boot time, and thus not under control of general system software. In this embodiment, only pre-OS firmware or on-chip microcode may write into the VARRa register. Thus, either register VARRa is not writeable by software at all (in case it is written by processor microcode), or is write-once after reset (if written by the firmware).

In an embodiment, the secure applet space can only be entered from secure kernel space. In this embodiment, it may be illegal to branch into secure applet space from the default security space, but there may be no restriction on the entry point into secure applet space from secure kernel space. In this embodiment, calling a function in the secure applet space from the address space with default security privilege requires a transfer of control to the fixed entry point in the secure kernel space with proper "credentials" for a request of a function within the current secure applet space. The secure applet address space may exit to the space with a current security privilege level of 3 through any control transfer mechanism. However, if an applet wants to call a function in space with default security, it does so through a function call to its secure kernel space.

In an embodiment, transitions between secure applet space and secure kernel space are similar to the transitions between address space with default security and secure kernel space, except an applet is allowed to call additional security kernel functions. In this embodiment, the secure applet space may use any control transfer mechanisms for control transfer within secure applet space, except that all interruptions cause exit from secure applet space. Secure applet space may use a call/return mechanism only if security kernel supports the management secure applet stack space, and transitions between secure and non-secure application stack spaces. Support for such a capability in the secure kernel is optional.

Secure Physical Memory (RAM and Non-Volatile) Partitions

In an embodiment, the security extensions define one "secure" partition in the physical memory. If a processor implements only security kernel privilege level, the size of the secure physical space is equal to or greater than the size of the secure kernel space. If a processor supports both security kernel and applet privilege level, then size of the physical partition may be equal to or greater than the sum of the secure kernel and applet spaces. The secure physical memory partition may be defined by a Physical Address Base Register (PABR) and a Physical Address Range Register (PARR). In an embodiment, both the base and the range of secure physical memory partition are fixed at the boot time, and thus are not under control of general system software. Only pre-OS firmware may write to PABR or PARR registers. Thus these registers are write-once only after the reset.

The physical address partitions may be used to provide the physical memory for secure virtual address partitions when the virtual address mechanism is enabled (e.g., processor is executing in protected mode). When the virtual address mechanism is disabled (e.g., processor is in real mode), the processor hardware may disallow any accesses to secure physical memory partitions, with any access to secure physical memory partitions in real mode resulting in an illegal operation trap.

In an embodiment, the secure physical memory partitions may be provided as physical memory in the processor die, a separate die in the same package, or as a part of the external system memory. In the case where the secure physical partition is implemented as part of the external system memory, it is advantageous if the memory controller also implement a pair of registers similar to PABR and PARR, and ensure that this address space is not accessed by DMA devices. Pre-OS BIOS may verify the presence of the appropriate protection mechanism in the chipset. A portion of the secure physical memory may correspond to non-volatile memory. The base address used for the NV physical memory partition may be same as PABR. There may be an additional range register NV Memory Range Register, or NMRR, that defines the size of the Secure NV memory partition and can only be written by SPL 0 code. Secure NV memory space may reside as a separate die in the same package or as part of an external component. In an embodiment, this NV memory is only accessible if the request is initiated by code running in secure kernel space.

In an embodiment, there are four architectural partitions within the secure address space: 1) secure applet space, 2) secure physical memory associated with applet address space for executing a security kernel function requested by an applet, 3) secure physical memory for kernel code and data, and 4) secure NV memory. Secure physical memory for the applet space, and the portion of secure kernel space associated with the applet execution, may be a per process resource. Secure kernel space may implement a function to save the encrypted version of the content of secure applet physical address space as well as part of the secure kernel space that is reserved for a security kernel function called from secure applet code. Secure kernel address space may also implement a function to restore the secure applet physical memory and a part of the secure kernel space associated with the applet space. These functions enable "virtualization" of secure applet physical memory and the kernel memory associated with the applet space between several processes. The integrity of the swapped-out state may be provided by keeping a hashed value associated with the swapped state in the secure NV memory, along with a "unique tag" corresponding to this instance of the saved state.

In an embodiment, there is enough secure kernel physical memory provided to enable concurrent execution of several kernel functions, and there is no need to allow swapping out kernel functions initiated by the security driver in the middle of the execution. In a further embodiment, once secure kernel space allocated for execution of security functions is in use, any future requests for kernel security functions are blocked till previously executing security functions are completed.

Processor Keys

In an embodiment, along with unique IDs, processors may also have a private/public key pair. The key pair may be an RSA key pair, DSS key pair, or some other key pair, with RSA being the most advantageous. The private key may be "burned" inside the processor and only used with specific kernel security functions. These security functions may only execute at privilege level cp1.0 (hence within the kernel security space). The public key may also be provided in the processor with the associated certificate. On-chip NV storage may be provided for full private and public keys. It is sufficient to provide storage for enough components that constitute the public and private key such that at power-up the processor is able to compute full keys using on-chip microcode or kernel code without exposing the private key. The part of the public key certificate corresponding to the signed value of the key should be also provided in on-chip NV memory. In an embodiment, an RSA key pair, for 1024 bit private keys, requires 1344 bits of hidden NV storage on the processor: 512 bits for P component, 512 bits for Q component, and 320 bits for the public key certificate (assuming that signature in the certificate are DSS signature).

In addition to the private and public keys, the processor also may have 56 bits (or should have support for triple DES) of a DES key in the on-chip NV cells. This key may also be kept private for the processor, and may be used only for performing DES function for stores/reads to/from external secure physical memory. In an embodiment, a platform specific DES key is used instead of processor specific DES key.

Interaction of Security Privilege Levels and Processor Modes of Operations

In an embodiment, there are minimal interactions between default processor execution and the Current Security Privilege Level. In a further embodiment, when the virtual translation mechanism is off (i.e., processor is in real mode), the CSPL is forced to 3 (i.e. default mode) and it is illegal to access secure physical address partitions. The security mechanism may be disabled for real mode or virtual mode. In this embodiment, when virtual translation mechanism is ON, (i.e., the processor is in protected mode), any TLB miss for accesses to secure virtual address partitions are handled directly by the processor using a new translation algorithm. The TLB-misses may not result in any TLB related faults.

In an embodiment, the Page Translation Entries formats for virtual to physical mappings for secure address space are defined such that, within secure address space, access rights are only controlled by CSPL. When executing code from any of the secure virtual partitions, performance monitoring capabilities are disabled. Where there may be transitions out of secure kernel or applet space due to interruption or external interrupt, appropriate registers may be saved in a predefined block within secure kernel space. Where there may be external system memory used for saving temporary values in the registers, prior to writing the data within secure address space to external memory, the processor may automatically encrypts the values with an on-chip DES unit using the platform specific "cover key." After saving of these registers in secure physical memory, the corresponding process register values may be changed to some legal, but meaningless, values. For example, most data/address registers may be changed to all "zeros," except EIP may be changed to some fixed legal value.

Transitions out of security address spaces may be handled by on-chip microcode or by an interrupt mechanism within the kernel security virtual address partition. Where external memory is used for the security physical address partitions, some implementations may support fetching encrypted version of instruction stream using DES with platform's "cover-key" from security virtual address partitions.

In an embodiment, a new secure transition (TSR) may be defined. According to this embodiment, any control transfer mechanism that transfers program control into secure kernel space from any other space provides caller's CPL and CSPL in this register. Code at the entry point in the secure kernel space can examine these bits and the requested service to determine whether or not the requested service should be allowed. For example, several of the security services can only be requested by code at CPL of 0 (i.e. security driver). In an embodiment, the TSR register may only be updated by hardware or secure kernel code (CSPL of 0).

In an embodiment, there are fixed entry points for the secure kernel space. In this embodiment, a branch to any other offset is illegal. One of the registers may specify the function number to be executed within the security or application address space. Some of the functions may require additional parameters as well, for example input operands, a key to be used for decrypting the target code/data, etc. In an embodiment, no transfer of control into secure applet space from address space with default security (CSPL of 3) is allowed. In another embodiment, cache control bits for secure virtual address space are predefined to select "write-back" attribute for the secure physical space.

Security Instructions

Security instructions may be provided to implement the functions of the present invention. These instructions may be classified as either instruction required for supporting the security functions or instructions to improve performance of either security functions, or transitions between different privilege levels. In an embodiment, the minimum native security functions require that the implementation support a kernel security privilege level at "logic analyzer" threat level. The instructions that may be used to support this level of functions are: (1) an instruction to read processor private keys at cp1.0 privilege level, (2) an instruction to write into platform "cover" key and another model specific register at cp1.0 privilege level, (3) an instruction to read a processor's public key, along with its certificate, at any CPL or CSPL, and (4) an instruction to read RNG at any CPL or CSPL.

Other instructions may be defined to facilitate implementations, and to expedite the transitions between address spaces with different security privileges. These may include a branch "hint" instruction to indicate that a upcoming control transfer instruction actually will involve change of Current security privilege level. This instruction may be implemented as an instruction that transfers control to code in the secure applet space, an instruction that transfers control to secure kernel space, and/or an instruction that transfers control to the default security privilege level. Another instruction that may be used is an instruction to store to secure NV memory. This instruction may help implementation by making it known in the front-end, instead of the back-end, of the design that the current store is targeted to NV memory.

Software Model

There are a large number of options possible for to implement the security kernel space. In one embodiment, the security kernel may implement only one security function. In an further embodiment, the security kernel may support additional functions by simply implementing additional functions in macrocode. In another embodiment, the security kernel may implement a policy of allowing only one function to be invoked by the security driver at a time. In this case, the previous security function should complete before any additional security function execution is initiated. In another embodiment, the security kernel may support only one live function within its resources, but allow virtualization of the secure kernel space by the security driver. This approach may lead to significant overhead for encrypting the state of a partially executed function, and performing integrity checks for a newly loaded function. Another embodiment provides enough space in secure kernel space to allow several security functions to be live simultaneously, and not support "virtualization" of this space.

In an embodiment, when an application with CSPL of 3 wants to call a kernel security function, it should to make request via a security driver running at CPL of 0 and CSPL of 3. For performance reasons, the architecture may allow an application to call a function in its associated secure applet without the overhead of a call through the security driver. An application at CSPL of 3 may make such a request through secure kernel space as long as the restrictions on the entry point into secure kernel space are followed. Secure kernel code at the fixed entry point may be responsible for verifying that the caller had appropriate privilege levels (both PL and SPL) to request the specified service. For this purpose, a new register, Transition Status Register (TSR), may be defined to provide PL and SPL of the caller into secure kernel and applet space.

For performance reasons a secure applet may be allowed to transfer control back to application through a control transfer instruction. To preserve the privacy of execution, an applet should use a call instruction to transfer control to the application only if the security kernel provides support for a secure stack. In an embodiment, rather than putting the burden on the secure kernel space for verifying the caller, a transfer of control request from application to secure applet space may be only allowed through a security driver. In an embodiment, infrastructure also allows secure applets to call a security function in kernel space through a direct control transfer instruction as long as restrictions on the entry point are followed. Secure kernel space may provide only enough space associated with the current secure applet to support one live security function call at a time. In an embodiment, even though security kernel space can be entered from any CPL and any CSPL, security kernel code at the entry point ensures that only permitted security kernel service requests are made from a given PL and SPL. Security kernel code at the entry point may examine privilege levels of the requester in Transition Status Register (TSR) to make this determination.

Registers

Registers may be used to manage the secure partition mechanism. These registers may include base and range registers for the secure kernel virtual address space, applet virtual address spaces, physical address space, and non-volatile memory address space. Registers may also be provided to access various processor keys. These may include a register for a processor private key, a register for a processor public key along with signature corresponding to the certificate, and a processor DES "cover-key." The registers may be read only registers.

Other registers may include a transition status register that provides the PL and SPL of the caller for the transition into security address spaces. In addition, a unique tag number register may hold a tag number assigned to a specific instance of hidden execution. An interrupted security privilege level register may be used to record the security privilege level. These registers may be read/write registers.

Secure Kernel and Applet Virtual Address Space Management

In an embodiment, the secure kernel and applet address spaces are only defined when the virtual-to-physical translation mechanism is enabled. Security capability may not rely on the OS's memory manager to provide the mapping of the secure virtual address partitions to the secure physical memory. There may be a fixed mapping defined between secure virtual address partitions and secure physical partitions. There may be no provision for access and dirty faults for secure virtual address space, and cache control bits may be set to "write-back" mode. In an embodiment, the OS service is not needed to establish the link between the secure virtual address space and the secure physical address space. In a further embodiment, there is no notion of page faults for these virtual address partitions.

Secure virtual space may be mapped to secure physical space using a fixed linear mapping. Page translation may be a function of the PABR and VARRk registers. Access rights may be predefined. These access rights may allow execute/read/write rights for all CPLs, thus enabling the virtual secure partition to reside at any CPL. In this embodiment, once a transition into the secure address space is allowed by the secure kernel code at the entry point, access permissions for a given virtual address within the secure partition are only controlled by CSPL.

In an embodiment, secure virtual address space is freely relocatable. In this embodiment, any time a secure virtual partition is relocated, all previous valid mappings for the relocated secure virtual partition are invalidated. In this way, anytime a branch to the new secure virtual partition is made, there is a new valid TLB entry established for the new partition. In a further embodiment, the TLB mechanism for virtual address space with default security is enhanced to ensure that physical page addresses for these PTE's do not overlap with the secure physical space. A potential overlap may cause an illegal operation fault.

Interruptions

In an embodiment, hidden execution for both kernel and applet addresses may be interrupted by software and/or through external interrupts. Architecture mechanisms may be provided to allow saving context of a process that might have been in the middle of hidden execution at either the kernel or applet security privilege level. Even if a process is interrupted due to single-stepping while executing in one of the security privilege levels, the hardware and software mechanisms may ensure that the privacy and integrity of the execution is preserved up to threat models. The mechanism used to handle interruptions is dependent upon the features of the processor architecture. In one embodiment, a routine is added to existing interruption microcode to address the security issues if the code executing in security privilege level is interrupted. In another embodiment, a new security interrupt vector table is defined to handle these interruptions. In this embodiment, any interruption while the program is executing in security privilege level is redirected to the handler in security kernel address space. This secure interrupt handler may perform the critical functions to ensure privacy and integrity of the interrupted code, and then branches back to the default interruption vector with all the correct associated interruption status information.

Security Levels Specification

Different implementations may provide protection against different levels of threats. For example, some implementations may provide protection against only software, intelligent IO and logic analyzer (observe mode only) attacks, while other implementations may provide protection against all threat models including the threat from Ion-beam attack. The ability to protect against a class of threats defines a security level. All security levels should provide protection against a simple hardware attack comprising of de-socketing of the processor and placing it in an integrity compromised platform to circumvent the reliance on high integrity BIOS for establishing secure physical space. In one implementation, the processor ensures integrity of the platform by authenticating the BIOS using processor microcode or on-chip BIOS verification firmware code. In this case, BIOS code may validate the presence of any required security feature in the chipset.

In one embodiment of a Security Level 1 (SL-1) model, protected partitions of external system memory and system NV (Flash) memory for mapping secure virtual address partitions are used. In an embodiment, the code for hidden execution is encrypted using a common platform key and is kept in the protected physical memory in encrypted form. For some of the functions that operate on the device's private key, precautions may be taken to ensure that they do not have any branches that are dependent on the bits of the device's private key. This may be is achieved by use of a conditional move instruction or by use of predication capabilities. In an embodiment, all intermediate computation data is kept in the clear form only in the processor registers and on-chip caches. In an embodiment, anytime the data in the secure address range needs to be stored in the external protected physical memory partition, the outbound data is encrypted using a DES unit in the Bus Interface Unit. There may be a separate a DES unit, or a common DES unit may be shared, for decrypting the incoming data and code from the secure physical address space. It is advantageous if the DES unit uses at least a 56-bit DES key. Some implementation may use a larger key (in case triple DES is used).

Security level 1 may address the security threats up to the logic analyzer (observe mode) for all hidden execution. When the code in secure physical space is in encrypted form, it is extremely difficult to get access to the processor/platform secrets by modifying the external bus signals actively. However, this security level does not provide any guarantee against such an attack. In a further embodiment, tamper resistance software is used to make "known-text" attacks even hardware. The Security Level 1 model may also provides some protection against use of implementation probe mode and debug hooks to get access to the implementation specific state in order to decipher private data. Additionally, the SL1 model may employ some limited amount of protection against voltage and frequency tampering techniques to make the processor behave incorrectly to get access to the private data.

In the SL-1 model, the protection of the secure partition of the physical memory may be provided by the virtual-to-physical translation mechanism, DES encryption in the processor, and via a physical memory type register in the memory controller. In the SL-1 model, privacy of the secret data may be ensured by operating on the secret data only with-in the processor storage. Any time data within the secure physical memory address range is written out on the bus, it is encrypted using DES unit in the BIU. For some systems, it is desirable that a DES unit be available for encrypting/decrypting data/code to/from secure physical memory uses platform specific key and not processor specific key.

Since in SL-1 model all external code and data in the secure physical address space may be kept encrypted with the platform key, one can not decipher code or data by just looking at the external bus signals with a logic analyzer. Processor/platform private keys may be protected to a higher level of threat model. Since external code is encrypted, it is extremely difficult to know which instructions in the function are accessing the private key, or how to modify incoming instruction bit stream such that the processor ends up writing out the private data in the clear memory. The SL-1 model also provides a modest amount of protection against use of processor implementation specific debug and machine-check mechanisms as well as voltage and frequency tampering techniques to get access to processor/platform secrets.

An embodiment of the Security Level 2 (SL-2) model raises the security level beyond SL-1 by providing on-chip physical memory for at least a portion of secure physical memory partition. In this case, all of secure NV memory partition still reside in the platform. Some of the volatile secure physical memory may also reside in external system memory. Security protection for the portion of secure volatile memory that is part of the external system memory is similar to SL-1 level. In the SL-2 security model, code for hidden execution may be downloaded from external memory in encrypted form. The code may then be decrypted and verified for integrity using processor on-chip memory. The decrypted code is then executed out of the processor's on-chip memory. All the private data is also kept in the on-chip memory may be in the clear form.

According to an embodiment of this model, on-chip memory is a shared processor resource that is managed by the security driver. Part of the on-chip memory may be shared by different processes. The virtualization of this shared portion of the on-chip memory may be done by the driver. There may be security kernel functions available to the driver to provide the ability to encrypt-and-save the part of the on-chip memory. There may also be a security kernel function available to decrypt-and-restore previously saved partition of the on-chip physical memory. Any stores of private data to external NV memory may also be encrypted using the same DES. The SL-2 model may provide a higher level of protection against attacks using processor implementation specific probe mode or debug hooks, as well as via voltage and frequency tampering.

In the SL-2 model, the protection of the secure partition of the physical volatile memory may be provided by the virtual-to-physical translation mechanism, on-chip physical memory and via use of DES encryption for the portion of secure physical space that is part of external system memory. The SL-2 model may raise the security level for both device/platform private keys as well as the processor hidden execution compared to SL-1 model. If all critical code and data in the external physical memory is kept in the encrypted form, and in the clear form only in the on-chip physical memory, an attacker can not decipher code or data by just looking at the external bus signals with a logic analyzer. Also, where downloads into the on-chip memory are checked for integrity, the integrity of hidden execution cannot be compromised by driving the external bus signals using a logic analyzer. The SL-2 model also may provide more protection against use of implementation probe and debug hooks to get access to the implementation specific state in order to decipher private data. The SL-2 model may also employ additional protection against voltage and frequency tampering techniques to make the processor behave incorrectly to get access to the private data.

An embodiment of the Security Level 3 (SL-3) model raises the security level beyond SL-2 by either providing on-chip secure NV memory, or bringing in secure NV memory partition within the same package as that of the processor die. In an embodiment, some of the volatile and non-volatile memory still may reside as a part of the system memory and system NV memory. Additionally, this security level may provide a much higher level of protection against use of implementation debug hooks, machine check architecture, and various implementation tampering schemes, as well as use of radiation attack. Some implementations may provide a protective die coating on the processor and NV memory silicon, as well as on the interconnect between the processor and secure NV memory die, in order to thwart Ion-beam attack. For the partitions of volatile and non-volatile memories are in system resources, these implementations provide security at least till SL-1 level.

In embodiments of the SL-3 model, the protection of the secure partition of the physical volatile as well as NV memory is provided by a combination of virtual-to-physical translation mechanism and on-chip physical memory. This model ensures privacy of the secret data by operating on the secret data only with-in the processor storage. This model may raise the security level for both device/platform private keys as well as the processor hidden execution compared to SL-2 model. In the SL-3 model, all storage involved in hidden execution may be brought into one package. This eliminates exposure of any internal signals between the computation engine and the storage for hidden execution. Additionally, in this model, on-chip (or the same package) NV memory also may allow protection against hardware replay attacks. The SL-3 model may provide extensive protection against leakage of private data through implementation specific probe and debug hooks. The model may also provides protection against various tampering approaches that may cause the processor to mal-function and potentially write out the private data in the clear form on the external buses. Some implementations may also provide a protective-die coating over the processor and private storage domain so that Ion beam attack can not be used to get access to the private data.

Macro Functions within the Secure Kernel Address Space

Some macro functions that may be implemented within the secure kernel address space are an authentication function, key management function, embedded verification kernel, sign function, verify function, load applet function, encrypted save applet, encrypted restore applet, and calling of a function in applet space.

Conclusion

Embodiments of the present invention relate to a method and apparatus for secure execution using a secure memory partition. The present invention provides several advantages over prior systems that have a special security coprocessor to protect code and data of a host processor. The present invention is more cost effective because a coprocessor is not needed. In addition, the present invention is a higher performance solution because the security code can be executed in the higher performance general purpose processor. Further, the present invention is a more efficient solution because there is no coprocessor data transfer overhead.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, the memory partition may be implemented in virtual memory or physical memory. As another example, embodiments may contain features the conform to either the SL-1, SL-2, or SL-3 security models.

I claim:

1. A system comprising:
a modem;
a display screen;
a flash memory;
a system memory, including a dynamic random access memory;
a plurality of general purpose registers;
cryptographic logic to encrypt and decrypt information, the cryptographic logic to support one or more of a Data Encryption Standard (DES) algorithm, a triple DES (3DES) algorithm, a Rivest-Shamir-Adleman (RSA) algorithm, and a Diffie Hellman algorithm;
a plurality of memory partition registers to define a physical address range in the dynamic random access memory for use as a secure memory partition;
plurality of execution units coupled to the plurality of general purpose registers, the plurality of memory partition registers, and the cryptographic logic; and
secure partition enforcement logic coupled to the plurality of execution units and the memory partition registers, the secure partition enforcement logic to selectively permit read or write access to the dynamic random access memory,
wherein the system is to support a first security privilege level to execute security functions or services, a second security privilege level to execute third-party supplied security code, and access to virtual address spaces inside and outside a secure memory partition by code at the first security privilege level.

2. The system of claim 1, further comprising a translation look-aside buffer to match virtual addresses to physical addresses in the system memory.

3. The system of claim 1, further comprising a key storage element to store key data.

4. The system of claim 1, further comprising a random number generator to provide random numbers.

5. The system of claim 1, wherein the plurality of memory partition registers include registers to specify a base address for the secure memory partition and a size of the secure memory partition.

6. The system of claim 1, further comprising:
a key storage element to store key data; and
a random number generator to provide random numbers.

7. The system of claim 1, further comprising:
a key storage element to store key data; and
a random number generator to generate random numbers, and
wherein the plurality of memory partition registers include a register to specify a base address for the secure memory partition.

8. A system comprising:
a modem;
a display screen;
a flash memory;
a system memory, including a dynamic random access memory;
a plurality of general purpose registers of a processor and which are on a die;
a key storage element on the die to store key data;
a random number generator on the die to provide random numbers;
cryptographic logic on the die and comprising at least some hardware, the cryptographic logic to encrypt and decrypt information, the cryptographic logic to support at least one of a Data Encryption Standard (DES)

algorithm, a triple DES (3DES) algorithm, and a Rivest-Shamir-Adleman (RSA) algorithm;

a plurality of memory partition registers to define a physical address range in the dynamic random access memory for use as a secure memory partition, wherein the plurality of memory partition registers are on the die and include registers to specify a base address for the secure memory partition and a size of the secure memory partition;

plurality of execution units of the processor and which are on the die and coupled to the plurality of general purpose registers, the plurality of memory partition registers, and the cryptographic logic; and secure partition enforcement logic coupled to the plurality of execution units and the memory partition registers, the secure partition enforcement logic to selectively permit read or write access to the physical address range for the secure memory partition in the dynamic random access memory, wherein the system is to support a first security privilege level to execute security functions or services, a second security privilege level to execute third-party supplied security code, and access to virtual address spaces inside and outside a secure memory partition by code at the first security privilege level.

9. The system of claim 8, further comprising a translation look-aside buffer of the processor which is on the die, the translation look-aside buffer to match virtual addresses to physical addresses in the system memory.

10. A system comprising:
a modem;
a display screen;
a flash memory;
a system memory, including a dynamic random access memory;
a plurality of general purpose registers of a processor and which are on a die;
a plurality of flags registers;
a random number generator on the die to provide random numbers;
a key storage element on the die to store key data;
cryptographic logic on the die and comprising at least some hardware, the cryptographic logic to encrypt and decrypt information, the cryptographic logic to support a Data Encryption Standard (DES) algorithm, a triple DES (3DES) algorithm, and a Rivest-Shamir-Adleman (RSA) algorithm;
a plurality of memory partition registers on the die to define a physical address range in the dynamic random access memory for use as a secure memory partition, wherein the plurality of memory partition registers include a register to specify a base address for the secure memory partition;

plurality of execution units of the processor and which are on the die coupled to the plurality of general purpose registers, the plurality of memory partition registers, and the cryptographic logic; and secure partition enforcement logic coupled to the plurality of execution units and the memory partition registers, the secure partition enforcement logic to selectively permit read or write access to the physical address range for the secure memory partition in the dynamic random access memory, wherein the system is to support a first security privilege level to execute security functions or services, a second security privilege level to execute third-party supplied security code, and access to virtual address spaces inside and outside a secure memory partition by code at the first security privilege level.

11. A system comprising:
a modem;
a display screen;
a flash memory;
a system memory, including a dynamic random access memory;
a plurality of general purpose registers of a register file;
a plurality of flags registers of the register file;
cryptographic logic to encrypt and decrypt information, the cryptographic logic to support one or more of a Data Encryption Standard (DES) algorithm, a triple DES (3DES) algorithm, a Rivest-Shamir-Adleman (RSA) algorithm, and a Diffie Hellman algorithm;
a plurality of memory partition registers on a die to define a physical address range in the dynamic random access memory for use as a secure memory partition;
plurality of execution units including an arithmetic logic unit on the die coupled to the plurality of general purpose registers, the plurality of memory partition registers, and the cryptographic logic; and
secure partition enforcement logic coupled to the plurality of execution units and the memory partition registers, the secure partition enforcement logic to selectively permit read or write access to the dynamic random access memory;
a translation look-aside buffer on the die, the translation look-aside buffer to match virtual addresses to physical addresses.

12. The system of claim 11, wherein the system is to support access to virtual address spaces inside and outside the secure memory partition by code at a first security privilege level that is to execute security functions.

* * * * *

UNITED STATES PATENT AND TRADEMARK OFFICE
CERTIFICATE OF CORRECTION

PATENT NO. : 9,619,672 B2  
APPLICATION NO. : 14/583062  
DATED : April 11, 2017  
INVENTOR(S) : Mittal Page 1 of 1

It is certified that error appears in the above-identified patent and that said Letters Patent is hereby corrected as shown below:

In the Drawings

On sheet 3 of 5, in Figure 3, reference numeral 365, Line 1, delete "KERNAL" and insert -- KERNEL --, therefor.

Signed and Sealed this
Tenth Day of July, 2018

Andrei Iancu
*Director of the United States Patent and Trademark Office*